United States Patent Office 2,833,818
Patented May 6, 1958

2,833,818
PROCESS FOR THE PREPARATION OF TEREPHTHALIC ACID

Ralph Landau, Roslyn Heights, and Alfred Saffer, Bayside, N. Y., assignors, by mesne assignments, to Mid-Century Corporation, Chicago, Ill., a corporation of Delaware No Drawing. Application July 30, 1956
Serial No. 600,706

16 Claims. (Cl. 260—524)

This invention relates to a process for the catalytic oxidation of diisopropylbenzenes by means of air or other molecular oxygen containing gaseous material to produce phthalic acids therefrom, and particularly to such a process wherein the catalyst is a manganese compound, and more particularly, an organic carboxylate salt of manganese. The invention relates especially to such a process conducted in the presence of a mixture of benzoic acid and an aliphatic acid of 5 to 6 carbon atoms, wherein preferably there is present 1 to 8 mols of said acids per mol of diisopropylbenzene.

Various attempts have been made in the past to oxidize dialkyl hydrocarbons in the liquid phase with molecular oxygen to produce dicarboxylic acids, particularly terephthalic acid. Heretofore it has not been possible to obtain more than very small yields, i. e., in the order of 1–3% of the desired dicarboxylic acids.

Terephthalic acid is a commercially highly desirable intermediate for the preparation of polyester type resins, and also for the preparation of polyester type textile fibres, such as the polymeric ethylene glycol terephthalate. For use in the polyester resins, the terephthalic acid may contain a substantial quantity of isophthalic acid, and indeed in some instances such a mixture leads to highly desirable products.

However, for use in synthetic textile fibres, a very high purity terephthalic acid is required and the art is confronted with the problem of providing high purity terephthalic acid in an economic manner.

Isophthalic acid is a commercially highly desirable intermediate for the preparation of polyester type resins such as glycerol, pentaethrythitol, and the like. Similarly, phthalic acid finds utilization in the preparation of alkyd type resins.

It has been found, in accordance with the invention, that phthalic acids may be prepared in a very convenient and economic manner by the oxidation of diisopropylbenzenes by means of molecular oxygen in the presence of a manganese compound, for example a manganese carboxylate catalyst; and the process is especially convenient and advantageous if carried out in the presence of a mixture of benzoic acid and an aliphatic acid of 5 to 6 carbon atoms in the molecule, using a ratio of 1 to 8 mols of said acids per mol of diisopropylbenzene.

The objects achieved in accordance with the invention as described herein include the provision of a process for obtaining high purity terephthalic acid in an economic and convenient manner by the reaction of molecular oxygen with para-diisopropylbenzene in the presence of a manganese compound, desirably a manganese carboxylate salt as catalyst; the provision of such a process wherein the reaction is carried out in the presence of benzoic acid and an aliphatic acid of 5 to 6 carbon atoms, preferably using a ratio of 1 to 8 mols of said acids per mol of para-diisopropylbenzene; and other objects which will be apparent as details or embodiments of the invention are set forth hereinafter.

Similarly, if it is desired to produce isophthalic acid or phthalic acid of high purity this object is achieved in accordance with the invention by substituting meta-diisopropylbenzene or ortho-diisopropylbenzene respectively, for para-diisopropylbenzene in the oxidation system described immediately above.

A feature of the present invention resides in the fact that mixtures of benzoic acid and the above-mentioned aliphatic acids are liquid at room temperature which facilitates handling. A further feature of the present invention resides in the fact that it is possible continuously to remove water from the reaction system as it is formed when operating at atmospheric pressure.

In order to facilitate a clear understanding of the invention, the following preferred specific embodiments are described in detail.

Example 1

Into a suitable reactor having a corrosion resistant inner surface (e. g., glass, ceramic, or corrosion resistant metal or alloy), equipped with agitating means such as mechanical agitating device or gas flow agitating means, and with means for heating or cooling the contents thereof such as a coil or jacket, a reflux condenser equipped with a separatory device for collecting water and refluxing non-aqueous condensate to the reaction vessel, a gas inlet tube, and optionally, a vent for passing off low boiling materials, there are charged:

175 parts by weight of diisopropylbenzene (87% para-)
210 parts of benzoic acid
40 parts of caproic acid
3.75 parts of manganese cumate The reaction vessel is about half filled with the liquid mixture.

Substantially 100% oxygen is fed into the reaction mixture at the rate of 1000 volumes (measured at atmospheric pressure and about 27° C.) per volume of hydrocarbon per hour, while the reaction mixture is maintained at 180° C., with vigorous agitation, for 9 hours.

The crude solid terephthalic acid in the mixture is separated by filtration, given three washings with about 100% acetic acid, each washing being with about 300 parts by weight of acetic acid per 40 parts of the precipitate, and then given three washings with water, using approximately similar amounts. The acetic acid washings are distilled; the residue may be recycled to the reactor or may be processed to recover isophthalic acid.

The exit gases from the reactor are passed through two Dry Ice traps in series, and the liquid collected therein during the reaction is washed with about 2 volumes of water to remove water soluble materials therefrom, and then added to the above filtrate. The filtrate is then combined with the residue from the acetic acid washings, and the mixture distilled.

The distillation is continued until the temperature reaches 139° C. at 1–2 mm. Hg pressure. The distillation is then continued up to a temperature of 250° C. at 1–2 mm. Hg pressure. The residue remaining in the distillation vessel is resinous and carbonaceous. The distillate cuts may be recycled to the reactor, e. g., in the next run.

A yield of 41.6 parts of crude terephthalic acid is obtained, of good quality (i. e., 38.3% of theory).

In a somewhat similar run using cobalt cumate as the catalyst and only benzoic acid, the crude terephthalic acid yield is about 2.5 parts by weight; and the acid product is dark in color and of relatively poor quality. These results indicate that a much higher yield of better quality product is obtained by using the manganese cumate catalyst as compared to the cobalt cumate.

Example 2

Example 1 is repeated substituting for the caproic acid there utilized an equal weight of enanthic acid. Substantially similar results are obtained.

Generally, in accordance with the invention, the yield may be in the range of 20 to 90% of phthalic acid of about 50 to 95% or more purity.

The crude terephthalic acid may be converted to dimethyl terephthalate by reaction with methanol in the presence of a catalytic amount of an acid such as hydrochloric, sulfuric, phosphoric or the like; e. g., 1 to 3% by weight of the reaction mixture.

Alternatively, the crude terephthalic acid may be converted to the corresponding acid chloride by reaction with thionyl chloride; and the latter converted to dimethyl terephthalate by reaction with methanol. For instance, 25 grams of crude terephthalic acid may be refluxed with 350 cc. of thionyl chloride for 8 hours, while a stream of nitrogen gas is slowly bubbled through the reaction mixture, to carry away the hydrochloric acid and sulfur dioxide by-product gases. The excess thionyl chloride is removed by evaporation, over a steam bath. The last traces of thionyl chloride are removed at low pressure. The resulting crude acid chloride is converted to the corresponding dimethyl terephthalate by refluxing with 600 cc. of absolute methanol for 16 hours. About two-thirds of the excess methanol is removed by evaporation, over a steam bath. The residue or sludge is then washed with acetone, and the residual methanol and acetone therein is evaporated, over a steam bath.

The crude dimethyl terephthalate is then steam distilled at 140 to 150° C. The vaporized dimethyl terephthalate is condensed, filtered, and then dried over calcium chloride at low pressure. The resulting dimethyl terephthalate product is of very high purity (melting point 141–141.5° C.).

In a comparative esterification procedure using pure terephthalic acid, 95% of the theoretical yield of dimethyl terephthalate was obtained.

Example 3

Example 1 is repeated substituting for the para-diisopropylbenzene there utilized a diisopropylbenzene fraction containing 50% paradiisopropylbenzene, 40% meta-diisopropylbenzene and 10% ortho-diisopropylbenzene. There is obtained a yield of 37.1% phthalic acids based on the diisopropylbenzene starting material.

While it is preferred to utilize the manganese compound in the form of a carboxylate, optionally as a salt of a particular carboxylic acid being utilized as a solvent, it will be realized that various other manganese salts are useful herein. These salts are illustrated, for example, by the oxide, hydroxide, nitrate, borate, and the like.

Example 4

Example 1 is repeated substituting for the manganese cumate there used an equivalent amount (based on manganese) of manganese oxide. Substantially similar results are obtained.

Example 5

Example 3 is repeated substituting for the manganese cumate there utilized an equivalent amount (based on manganese) of manganese hydroxide. Substantially similar results are obtained.

Example 6

In a series of two runs the procedure of Example 1 is repeated substituting for the manganese cumate there used equivalent amounts (based on manganese) of manganese borate and manganese nitrate respectively. Substantially similar results are obtained.

The metal carboxylate catalysts may be prepared by dissolving the appropriate organic acid in caustic, and then adding thereto an aqueous solution of the appropriate metal acetate. The desired metal carboxylate salt forms a precipitate, in the case of the carboxylic acids higher than acetic. The precipitate is separated by filtration, thoroughly washed with water, air dried, and then dried over calcium chloride under low pressure. For instance, manganese cumate may be prepared by dissolving 20 grams of cumic acid in 100 cc. of 5% by weight aqueous sodium hydroxide. A solution of 15 grams of manganese acetate dissolved in 75 cc. of water is gradually added thereto, with agitation. The manganese cumate precipitate which forms is separated by filtration, thoroughly washed with water, air dried, and then dried over calcium chloride under low pressure. An about 80% yield of the catalyst is obtained. The manganese cumate prepared in this manner is soluble in para-diisopropylbenzene; e. g., to a concentration of about 0.1% yield by weight. However, if the manganese cumate is oven dried at about 80° C. or higher for several hours, it tends to darken, and the darkened salt is much less soluble in para-diisopropylbenzene.

The crude solids obtained from the oxidation reaction mixture are washed with glacial acetic acid (about 100%). This washing step removes substantially all of the isophthalic acid therein, if any. This is a very convenient manner of obtaining a fraction of relatively pure isophthalic acid as well as a fraction of relatively pure terephthalic acid from the oxidation of a mixture of diisopropylbenzene containing substantial amounts of both the meta- and the para-isomers.

Desirable results are achieved with various modifications of the foregoing, such as the following. The benzoic acid is mixed with a minor portion of an aliphatic monocarboxylic acid of 5 to 6 carbon atoms, preferably saturated and liquid at room temperatures. The acid mixture may contain 0.02 to 0.98 mol of the aliphatic acid, or mixture of such acids, per mol of benzoic, desirably 0.08 to 0.6, and preferably 0.08 to 0.2. With the lower acids, the reaction may be conducted under pressure in order to maintain the lower acid in the liquid phase. The pressure may be in the range of 15 to 2000 p. s. i. g. (pounds per square inch gauge), preferably at least slightly above the boiling pressure of the acid at the reaction temperature.

The carboxylic acids should be stable in the reaction system, and preferably should be free of hydrogen atoms attached to tertiary carbon atoms.

The process may be conducted in a batch, intermittent or a continuous manner.

The reaction time may be in the range of 0.5 to 50 or more hours, the reaction time selected being sufficient to obtain a desirable conversion of the para-diisopropylbenzene to terephthalic acid.

The reaction temperature may be in the range of 150 to 275° C., desirably 150 to 250° C., and preferably 175 to 225° C.

The ratio of the benzoic acid or equivalent acid mixture may be in the range of 1 to 8 mols, desirably in the range of 1 to 4, and preferably in the range of 2.5 to 3.5 mols per mol of diisopropylbenzene. If lower amounts of the benzoic acid are used, there is some difficulty due to excessive resin formation. Higher amounts are operative but are not indicated for economic reasons.

The manganese carboxylate catalyst may be the manganese salt of any carboxylic acid, which salt is finely dispersible in the reaction system, desirably of a monocarboxylic acid of 2 to 10 carbon atoms, and preferably the salt of either an acid formed in the reaction system or of the acid used in the system.

In the production of terephthalic acid, the para-diisopropylbenzene fed into the reactor may be in the form of any technically pure mixture free from contaminants or materials which may interfere with the oxidation. Generally, the feed mixture may contain some meta-diisopropylbenzene and also some lower or higher alkylated benzenes. It may also contain some saturated aliphatic hydrocarbon material which is relatively resistant to oxidation in the system. For best product, substantially pure para-diisopropylbenzene should be used, e. g., 99 to 100%.

The amount of catalyst used may be in the range of 0.1 to 10% by weight based upon the weight of the reaction mixture, desirably 0.3 to 2, and preferably .75 to 1.7%, i. e., containing 0.2 to 4% of the metal.

The oxygen used may be in the form of substantially 100% oxygen gas or in the form of gaseous mixtures containing lower concentrations of oxygen, e. g., down to about 20%, such as in air. Where the gaseous mixture contains a relatively lower concentration of oxygen, a correspondingly higher pressure or flow rate of the gas should be used, in order that a sufficient amount or partial pressure of oxygen is actually fed into the reaction mixture.

The ratio of total oxygen fed into the reaction mixture relative to the diisopropylbenzene is in the range of 9 to 500 mols of oxygen per mol of diisopropylbenzene, desirably in the range of 10 to 300, and preferably in the range of 10 to 75.

It is indeed surprising that terephthalic acids may be prepared from diisopropylbenzene in such a convenient manner in accordance with the invention. In related tests with other materials such as lead cumate, silver cumate, cobalt octoate, zinc acetate, mercuric oxide, or vanadium oxide, resinous reaction mixtures were obtained and the yields were no better than cobalt cumate results. Furthermore, the system of the invention using a mixture of acids gives better results than benzoic acid alone (less undesirable resin or gunk formation) and better results than caproic or similar acid alone (less loss of these acids).

This application is a continuation-in-part of our presently co-pending applications Serial Nos. 344,679, filed March 25, 1953, and 364,950, filed June 29, 1953, each now abandoned.

In view of the foregoing disclosures, variations and modifications of the invention will be apparent to those skilled in the art, and it is intended to include within the invention all such variations and modifications except as do not come within the scope of the appended claims.

What is claimed is:

1. A process for preparing phthalic acids which comprises reacting diisopropylbenzene with molecular oxygen in the presence of a manganese compound and a mixture of benzoic acid and a saturated aliphatic monocarboxylic acid of 5 to 6 carbon atoms in the molecule, at a temperature in the range of 150 to 275° C. and in which a liquid phase of said acid mixture is maintained.

2. A process of claim 1 wherein the catalyst is a manganese carboxylate.

3. A process of claim 2 wherein the reaction mixture contains 0.1 to 5% of the catalyst based on the weight of the diisopropylbenzene.

4. A process of claim 1 wherein the monocarboxylic acid is enanthic acid.

5. A process of claim 1 wherein the monocarboxylic acid is caproic acid.

6. A process for producing terephthalic acid in a liquid phase oxidation which comprises reacting para-diisopropylbenzene with molecular oxygen in the presence of a catalytic amount of a manganese compound and a mixture of benzoic acid and a saturated aliphatic monocarboxylic acid of 5 to 6 carbon atoms in the molecule, the ratio of the said acid mixture being from about 1 to 8 mols per mol of diisopropylbenzene, under a temperature in the range of 150 to 275° C. and in which a liquid phase of said acid mixture is maintained.

7. A process of claim 6 in which the monocarboxylic acid is enanthic acid.

8. A process of claim 6 in which the monocarboxylic acid is caproic acid.

9. A process of claim 1 wherein the acid mixture contains 0.2 to 0.98 mol of aliphatic monocarboxylic acid per mol of benzoic acid.

10. A process of claim 9 in which the catalyst is a manganese carboxylate.

11. A process of claim 9 in which the catalyst is manganese borate.

12. A process of claim 9 in which the catalyst is manganese cumate.

13. A process of claim 1 in which the manganese compound is manganese oxide.

14. A process of claim 1 in which the manganese compound is manganese hydroxide.

15. A process of claim 1 conducted in a continuous manner wherein further amounts of diisopropylbenzene are added to the reaction mixture and phthalic acid is recovered from the reaction mixture as product.

16. A process of claim 1 wherein the ratio of said acid mixture is from about 1 to 8 mols per mol of diisopropylbenzene.

References Cited in the file of this patent

UNITED STATES PATENTS

| | | |
|---|---|---|
| 2,245,528 | Loder | June 10, 1941 |
| 2,552,278 | Hochwalt | May 8, 1951 |
| 2,723,994 | Haefele et al. | Nov. 15, 1955 |
| 2,746,990 | Fortuin et al. | May 22, 1956 |

FOREIGN PATENTS

| | | |
|---|---|---|
| 681,455 | Great Britain | Oct. 22, 1952 |